United States Patent [19]

Wittig et al.

[11] 3,777,053

[45] Dec. 4, 1973

[54] CONVERTER FOR CATV

[75] Inventors: Karl Wittig, Los Angeles; Guenther Wimmer, Saugus; Patrick R. J. Court, Los Angeles; Carl Akrell, Burbank, all of Calif.

[73] Assignee: Optical Systems Corporation, Los Angeles, Calif.

[22] Filed: May 16, 1972

[21] Appl. No.: 253,768

[52] U.S. Cl. .......... 178/5.1, 178/DIG. 13

[51] Int. Cl. .......... H04n 1/44

[58] Field of Search .......... 178/5.1, DIG. 13

[56] References Cited

UNITED STATES PATENTS

| | | | |
|---|---|---|---|
| 3,081,377 | 3/1963 | Watters | 178/5.1 |
| 3,387,083 | 6/1968 | Farber et al. | 178/5.1 |
| 3,078,337 | 2/1963 | Shanahan et al. | 178/5.1 |
| 3,689,688 | 9/1972 | Shanahan et al. | 178/5.1 |
| 3,073,892 | 1/1963 | Druz | 178/5.1 |

*Primary Examiner*—Benjamin A. Borchelt
*Assistant Examiner*—S. C. Buczinski
*Attorney*—Samuel Lindenberg et al.

[57] ABSTRACT

A converter for a CATV system is described. The converter includes, amongst other circuits, a reader for reading the binary bits on an encoded document and comparing them with a binary bit code which is transmitted from the transmitter on the CATV cable to a subscriber's receiver. If the code on the encoded document and the code received are identical, a signal is generated which enables the converter to process the received television signals so that the subscriber's receiver can present an intelligible program. Provision is also made in accordance with the code on the document, to select a predetermined one of a plurality of channels being transmitted over the CATV cable.

23 Claims, 11 Drawing Figures

CONVERTER FOR CATV

BACKGROUND OF THE INVENTION

This invention relates to CATV systems which employ encoding and decoding of television programs, and more particularly, to improvements therein.

A number of difference systems have been proposed for encoding television programs at a CATV system transmitter and thereafter decoding them at receivers using converters or decoders. These systems are used when it is desired to transmit television programs only to a selected audience, either of a particular group, if the subject matter or the transmission constitutes a lecture or lesson, or, if the program is one having entertainment value, then only to those subscriber's who pay for the program. In such systems, converters are provided at the subscriber's receivers which are connected between the receiver and the CATV cable. When transmission is to be to a selected audience, the converter may be provided with sets of push buttons or adjustable switches or other mechanisms, which must be properly actuated by the subscriber before his converter can function to properly decode the incoming signals.

The settings for the switches of converters of the type described are furnished to subscribers through the mail or by calling a central number. It should be obvious that once this information is given out, restricting it to a select few, dependent upon the silence of those to whom the information is given is difficult. Human nature being what it is, once the switch settings are known to the public, the private lecture or entertainment is usually joined by a large number of outsiders. Some proposed systems include recording equipment to monitor each time the converter is used and to what program it is tuned. These recordings must be collected and/or inspected. This considerably increases the expense of a converter as well as the expenses of obtaining such recording, inspecting them, and then billing the subscriber. Such a system has not proven very practicable.

What is needed is some way of insuring that only the converts of the selected audience are enabled, or at the very least, that whenever a converter performs the converting function, a CATV operator will be paid therefor.

OBJECTS AND SUMMARY OF THE INVENTION

It is an object of this invention to provide a system wherein authorized subscribers are enabled to view a specific television program and it is withheld from others.

Yet another object of this invention is the provision of an enabling system for a television converter which is maintained secret.

It is another object of this invention to provide a means to insure that a CATV operator is paid each time a converter is used for decoding an encoded television program.

Still another object of the present invention is the provision of a novel, and useful enabling system for a television converter.

These and other objects of the invention may be achieved in an arrangement whereby an encoded document or card such as punched cards are sold to CATV subscribers who wish to view a particular program. Each converter has an encoded card reader. Provision is made at a transmitter for sending, repetitively, a predetermined code sequence which is modulated on the audio carrier. This is received at the converter, separated from the audio carrier, and compared with the code on the card. If they are identical, then the converter is enabled to further process the signals received over the cable so that they may be intelligibly reproduced for human viewing by a subscriber television receiver. If card code and the received code are not alike, then the converter is unable to function.

Provision may also be made to select a particular channel out of the plurality of channels which are being transmitted over the CATV cable. The encoded card will have a region set aside for channel selection. If for example, the encoded card is a punched card, this can be one of a number of hole positions in the card, which, when read by the reader establishes a voltage level. This voltage may either be used to terminate the operation of signal seeking equipment or the voltage may be applied to a varactor controlled oscillator, which will oscillate at a frequency determined by the voltage applied to the varactor. The oscillator is used for heterodyning the received several television channels so that only the channel indicated by the punched card and to which the television receiver is tuned can pass to the receiver. The television programs sent over the cable are on carriers each of which can be heterodyned by the oscillator into the channel to which the receiver is tuned, by a separate oscillator frequency.

Also provision is made for transmitting a plurality of separate codes within a time frame. If the code on the punched card at the converter corresponds to one of the codes being transmitted, the converter will operate.

The novel features of the invention are set forth with particularity in the appended claims. The invention will best be understood from the following description when read in conjunction with the accompanying drawings.

BRIED DESCRIPTION OF THE DRAWINGS

DESCRIPTION OF THE PREFERRED EMBODIMENTS

Figure 1:
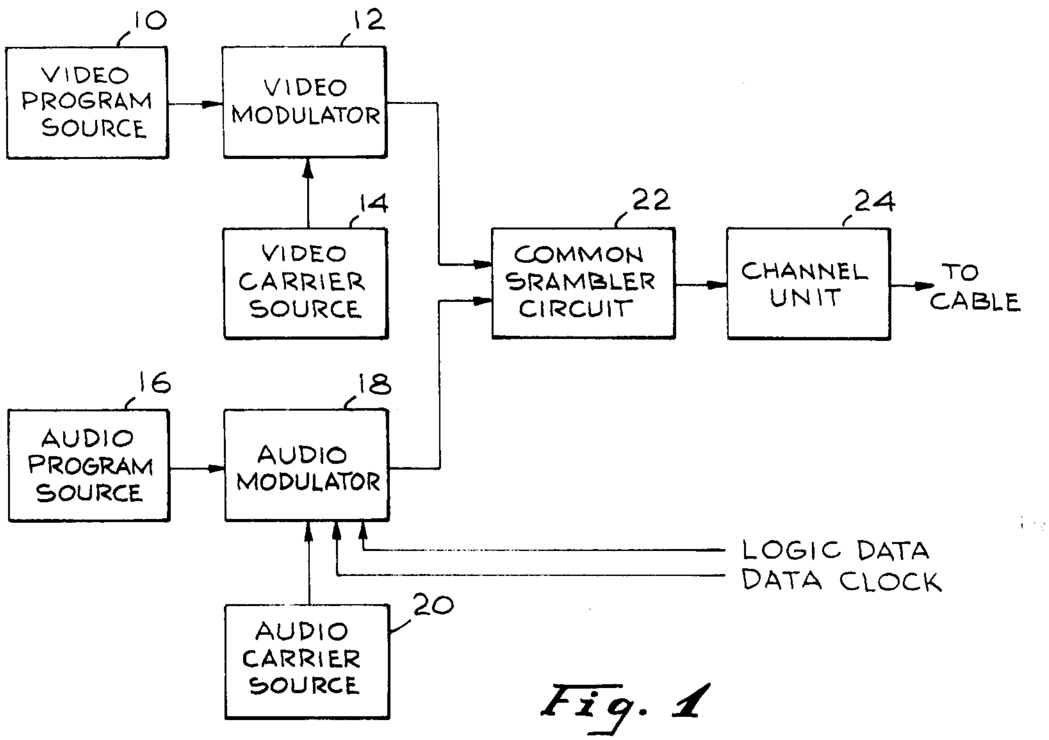
FIG. 1 is a simplified, block schematic diagram of a transmitter arrangement which may be used with this invention.

FIG. 1 is a schematic block diagram illustrative of the type of a transmitter with which the embodiment of the invention may be used. A video program source 10 generates the required video signals and applies them to a video modulator 12. A video carrier source 14 generates the video carrier upon which the video program signals are modulated by the video modulator 12.

An audio program source 16 generates the audio which accompanies the video program. Its output is applied to an audio modulator 18. The carrier for the audio modulator is generated by an audio carrier source 20. Also modulated on the audio carrier by the audio modulator is a data clock tone signal and a logic data tone signal. How the signals are generated will be described in connection with FIG. 2. This invention may be employed to withhold the television program from other than authorized subscribers without encoding the audio and video, however, if such encoding is additionally desired, then the outputs of the audio and video modulators are applied to a common scrambler circuit 22, which may encode audio or video or both as desired. Illustrative of suitable encoding systems are applications by Patrick R. J. Court, Ser. No. 184,474, filed Sept. 28, 1971, entitled "Audio Secrecy System" and Ser. No. 113,393, filed Feb. 8, 1971, entitled "Encoding and Decoding System for CATV" both of which are assigned to a common assignee. The output of the common scrambler circuit 22 is applied to a channel unit 24, which comprises circuits to send the output of the common scrambler unit on the cable either in the form received, known as subchannel, or on one of the usual channels 2 thru 13, or on "super channels," (above channel 13), as desired.

In accordance with this invention, in order to render a converter operative for the purpose of converting a program received from the cable, in a form suitable for processing by a subscriber's television set, the subscriber must insert an encoded card, henceforth exemplified by a punched code into a suitable slot in this converter. The code, represented by the holes punched in the card, is checked against a predetermined code which is generated at the transmitter.

Figure 2:
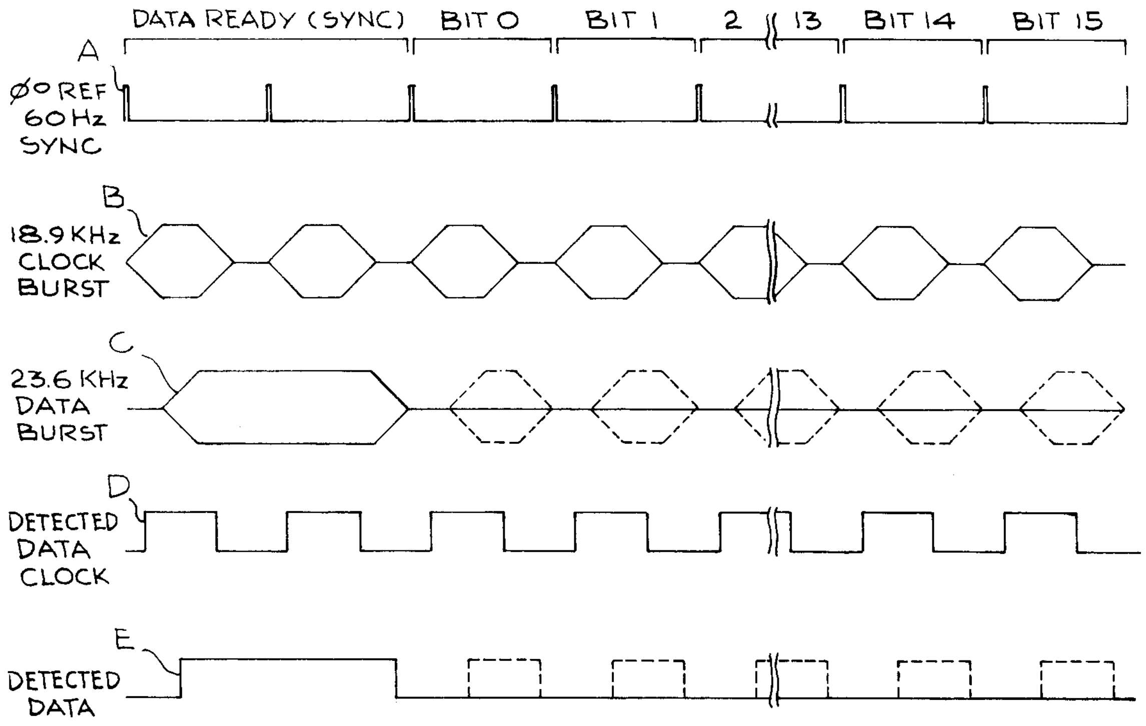
FIG. 2 is a representation of the clock and data waveforms provided for assisting and understanding of this invention.

FIG. 2 is a waveform diagram illustrating the kinds of signals which are employed in the embodiment of the invention code signals to be generated at the transmitter are synced in response to 60 Hz sync signals, shown on line A which are derived from vertical sync. Data clock bursts, as represented on line B are 18.9 KHz tone bursts which start at phase zero ($\phi o$) of bit time and end at $\phi$ 270°. Bit time is the interval between two sync pulses or 16.6 ms. A word frame is defined as the interval over which a data ready bit and 16 code bits are transmitted. This takes an interval of two bits for the data ready pulse and 16 bits for the code, which is approximately 300 ms. A row frame is represented on line C.

A data ready pulse comprises a 23.6 KHz tone burst which starts at 90° $\phi$ bit time and lasts for 540° of bit time. A code bit starts at 90° $\phi$ bit time and lasts for 180° of bit time and is also a 23.6 KHz tone burst. Detection at the converter of the commencement of transmission of a code is achieved by detecting the presence of a data ready tone burst and the leading edge of a data clock tone burst.

Figures 3, 4:
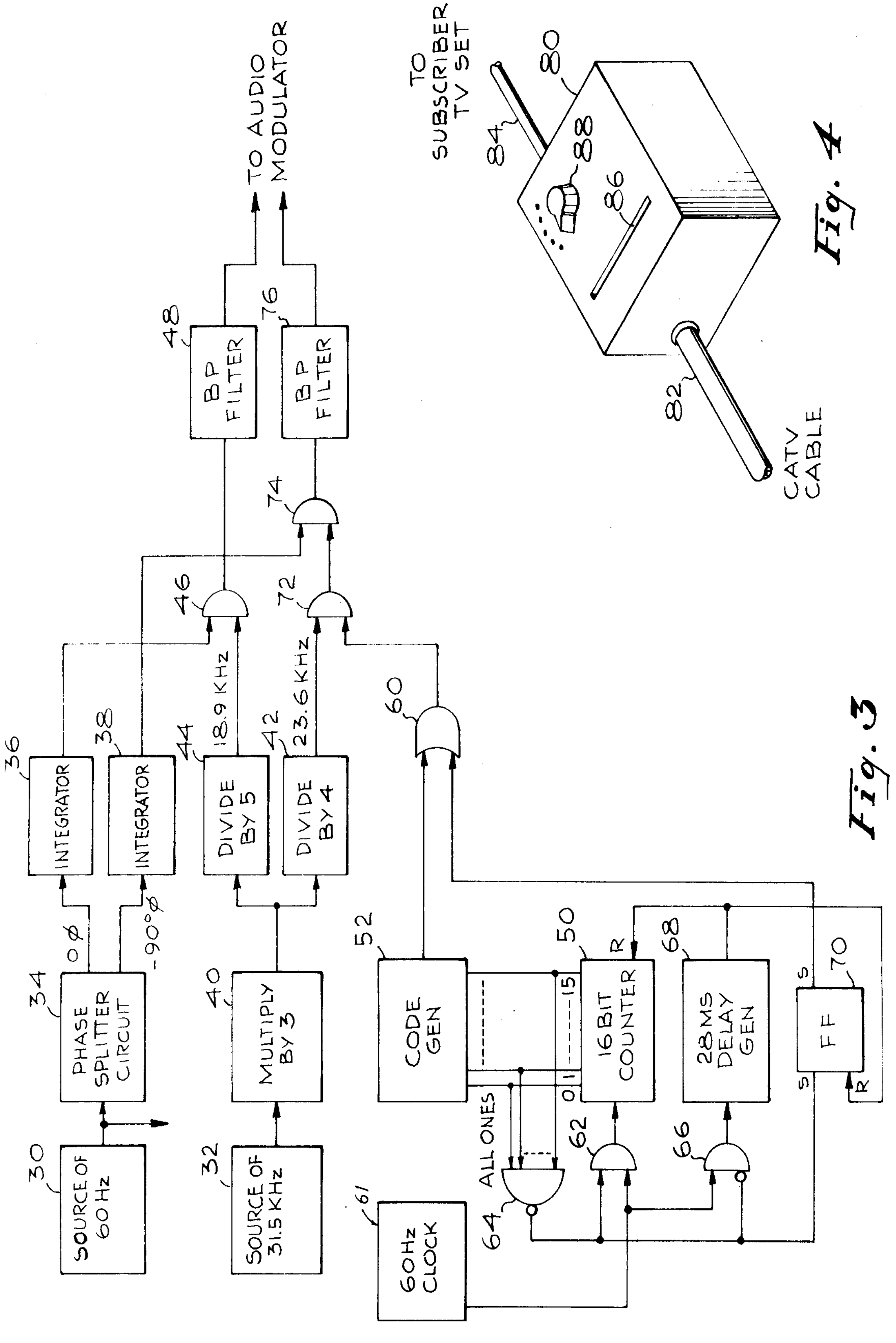
FIG. 3 is a block, schematic diagram of a circuit arrangement for generating clock and code signals which are required for this invention.
FIG. 4 is a representation of the external appearance of a converter in accordance with this invention.

FIG. 3 is a block schematic diagram of the circuits at the transmitter which are used to generate the code signals and timing described in FIG. 2. A television transmitter can provide vertical sync signals, at 60 Hz, and horizontal sync signals at 15,750 Hz which is frequency doubled to provide a 31.5 KHz sinewave. These are represented in FIG. 3 as a source of 60 Hz, 30, and a source of 31.5 KHz, 32. The 60 Hz signals are applied to a phase splitter circuit 34, whose outputs will comprise 60 Hz signals at zero phase and at 90° phase. The respective zero and 90° phase sync signals are next respectively applied to two integrators, 36, 38 which produce the trapezoidal waveshapes shown in FIG. 2 line B.

The 31.5 KHz signals from source 32, which are sine wave signals, are applied to a "multiply by 3" circuit 42 to triple the frequency to the value 94.5 KHz. The output of this circuit is applied to a "divide by five" circuit 44, to provide 18.9 KHz, and to a "divide by four" circuit 42 to provide 23.6 KHz. An AND gate 46 has applied the output of integrator 36 and the 18.9 KHz output of the divide by 5 circuit and its output therefore produces data clock pulses of the type shown in FIG. 2 line B. These are cleaned up by being passed through a band pass filter 48, the output of which is connected to the audio modulator.

The code which is to be transmitted may be generated in a number of ways. By way of example, a 16 bit counter 50 provides the timing signals for serializing the code output of a code generator 52. The code generator may be any of the commercially available circuits, usually a gating array which can be manually connected, or by means of the output of a punched card reader, to provide a code pulse train consisting of the presence or absence of pulses. These are applied to an OR gate 60.

The counter 50 is driven in response to 60 Hz pulses received from the source 61. These are applied to an AND gate 62, which is enabled by the output of a NAND gate 64, except when the counter 50 is filled, i.e. its output are all ones. At that time, the output of NAND gate 64 inhibits the AND gate 62, the counter no longer counts, and the output of NAND gate 64 enables a Not AND gate 66 to apply 60 Hz pulses to a 28 ms delay circuit 68. The output of NAND gate 64 also sets a flip-flop 70. Delay circuit 68 which may be a shift register, for example, produces a 28 ms delay. The outputs of the last delay circuit resets the 16 bit counter and the flip-flop 70. Thus, the output of flip-flop 70 is a 28 ms pulse.

The 28 ms pulse output of flip-flop 70 is applied to the OR gate 60, and since AND gate 62 is now enabled again, it is followed by the 16 bit code. The output of OR gate 60 which is a word frame is used to enable an AND gate 72 to pass tone bursts. These are applied to an AND gate 74 which has as a second input the clock pulse output of the integrator 38. The output of the AND gate 74 is applied to a band pass filter 76. The output of band pass filter 76 has a waveform represented by line C in FIG. 2. This output is applied to the audio modulator 18 in FIG. 1.

FIG. 4 is an illustration of the appearance of a converter which may be employed in accordance with this invention. It may comprise a box 80 having its intput connected to the CATV cable 82, and its output connected to the subscriber's TV set 84. The box will have a slot 86 into which a punched card is inserted to be read. The box will also have a selector switch 88, which may be positioned to either bypass the converter, or to insert the converter between the CATV cable and the subscriber's television set.

Figure 5:
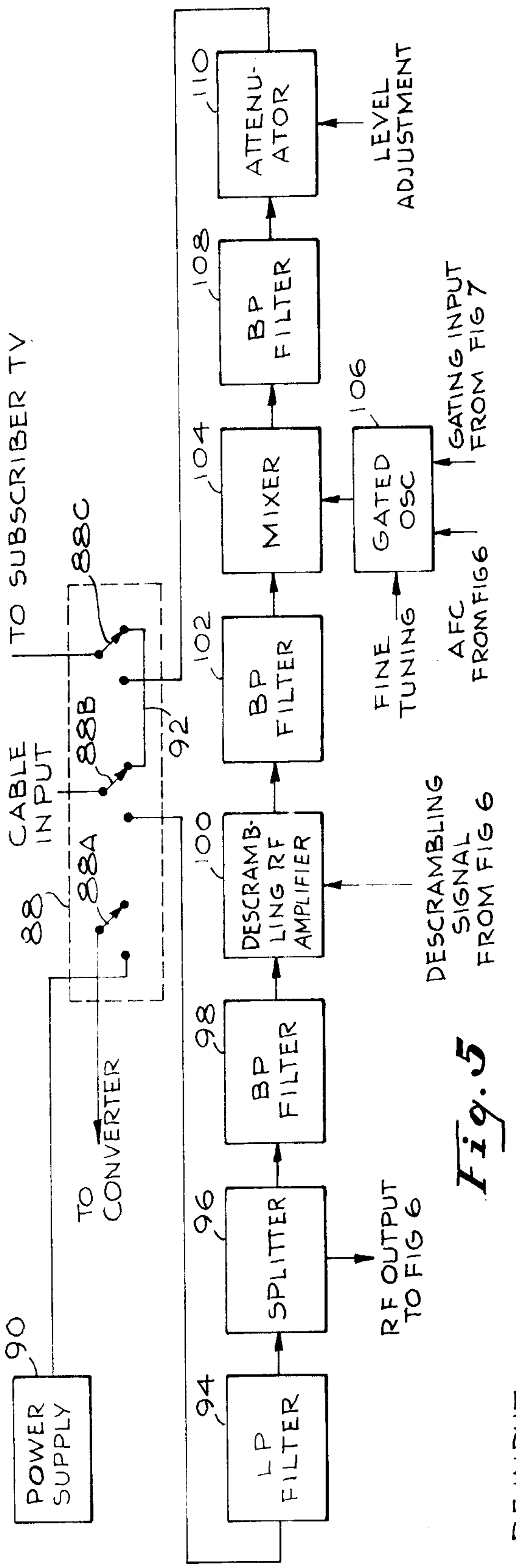
FIG. 5 and FIG. 6 are block schematic diagrams generally illustrative of the contents of a converter in accordance with this invention.

FIG. 5 is a block schematic diagram of a portion of the structure for circuitry required at a converter, in accordance with this invention. The switch 88 comprises a three pole double throw switch. When in one position, the one shown in FIG. 5, the three switch swingers respectively 88A, 88B, and 88C, diconnect the power for the converter which is received from a power supply 90, and, by means of the jumper 92, connect the cable input directly to the subscriber TV set, thereby bypassing the converter. In the second position, power is supplied to the converter and the cable input is connected to the converter and the output of the converter is connected directly to the subscriber's TV set.

When the switch 88 is at the position whereby the converter is inserted between the cable and the receiver, the signal on the cable, comprising scrambled video, scrambled audio and the clock and data signals, are applied to a low pass filter 94 which eliminates any unwanted high frequencies. The output of the low pass filter is applied to a power splitter 96, which comprises a circuit arrangement for applying a portion of the received radio frequency signals to the circuit shown in FIG. 6. The power splitter can simply be a radio frequency transformer having two outputs, one of which is applied to the circuitry shown in FIG. 6 and the other which is applied to a bandpass filter 98. The bandpass filter insures that the radio frequency signals are those within the desired channel. By way of example, these can be the signals between 44 and 50 megahertz while the low pass filter can be a filter which passes signals below 52 megahertz.

The output of the bandpass filter may be applied to circuitry for descrambling the video signals which were encoded at the transmitter and which are here designated as the descrambling rf amplifier 100. By way of example, an arrangement for performing the descrambling function is shown and described in the applications by Patrick R. J. Court, previously referred to herein. A second required input to the descrambling rf amplifier is a descrambling signal which is derived from the circuitry shown in FIG. 6.

The output of the descrambling rf amplifier is applied to a second bandpass filter 102, which again limits the signals to, for example, the frequencies between 44 and 50 megahertz. The output of the bandpass filter is applied to a mixer 104, which heterodynes these signals with the output of a gated oscillator 106, to a frequency of a desired channel, such as the frequency for channel 12. Oscillator 106 is enabled to continue oscillating only so long as it receives a gating signal from circuitry shown in FIG. 7.

The bandpass filter 108 insures that the signals which it passes fall within the prescribed frequencies for channel 12, (which should be understood as being exemplary), which are the frequencies between 204 megahertz and 210 megahertz. The output of the bandpass filter 108 is applied to an attenuator 110, which establishes the proper level of these signals so that they can be applied through the switch 88 to the subscriber television receiver.

Figure 6:
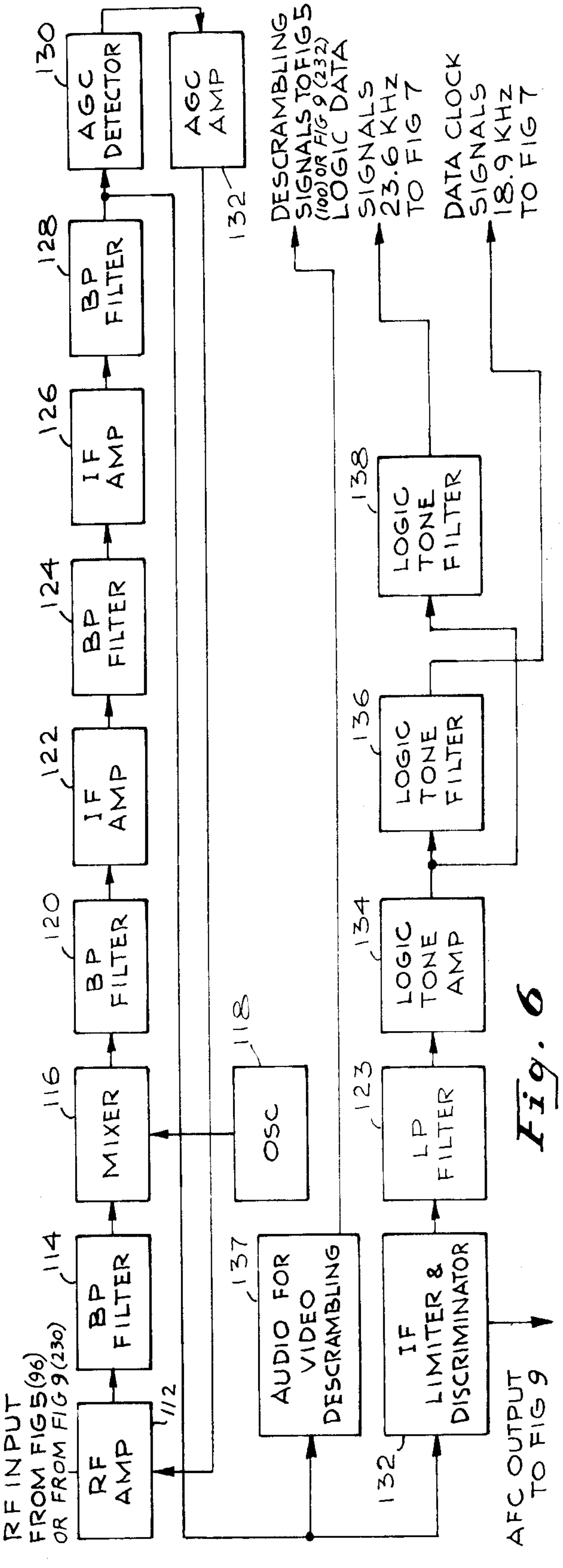

Referring now to FIG. 6, there may be seen the remainder of the circuitry required in accordance with this invention. The radio frequency signals from the splitter 96 are amplified by radio frequency amplifier 112, whose output is applied to a bandpass filter 114. The bandpass filter insures that the frequencies stay within a predescribed bandwidth. Its output is applied to a mixer 116 for the purpose of being heterodyned down to a suitable IF frequency. The output of an oscillator 118 supplies the heterodyning frequency. The output of the mixer 116 is applied to a bandpass filter 120. Its output is applied to an IF amplifier 122. The output of the IF amplifier is applied to another bandpass filter 124. This output is again amplified by IF amplifier 126. The IF amplifier output is applied to a bandpass filter 128, whose output by way of example has a center frequency of 10.7 MHz. The bandpass filter 128 output is applied to an automatic gain control detector 130. Its output is applied to an AGC amplifier 132, whose output in turn is fed back to RF amplifier 112.

The output of the bandpass filter 128 is applied to an IF limiter and discriminator 132, and also to descrambling circuits 137. The descrambling circuits have the function of providing the required descrambling signal to the descrambling RF amplifier 100 shown in FIG. 5. The output of the IF limiter and discriminator 132 is applied through a low pass filter 123 which rejects the audio to a logic tone amplifier 134 which derives therefrom the 18.9 kilohertz data clock signal and the 23.6 kilohertz data logic signal. Its output is applied to two logic tone filters respectively, 136 and 138. Filter 136 separates out the data clock signals and filter 138 separates out the logic data signals. These two signals are respectively applied to the circuitry shown in FIG. 7.

Figure 7:
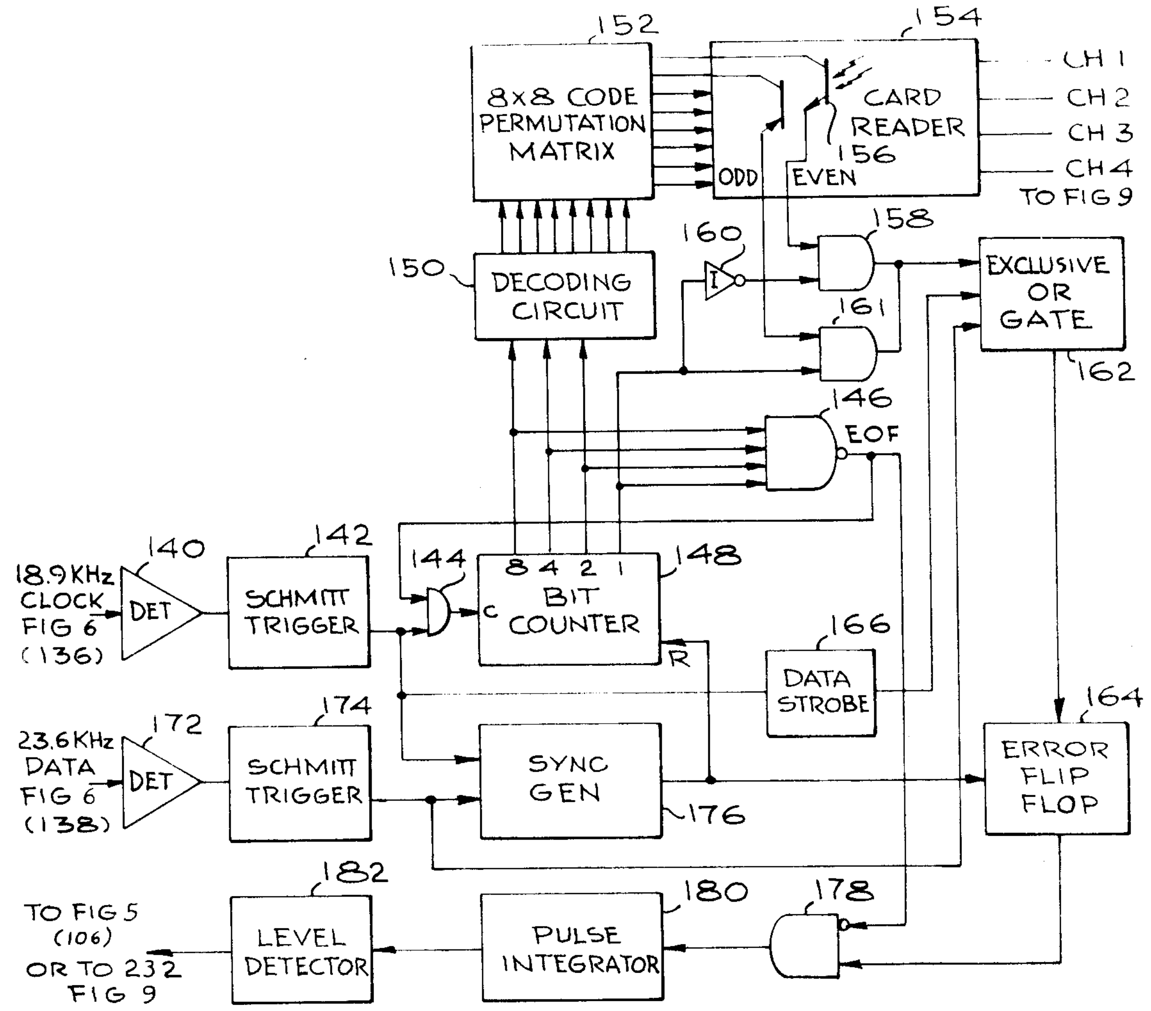
FIG. 7 is a block schematic diagram representative of the details of the logic section of a converter in accordance with this invention.

Referring now to FIG. 7, there may be seen a block schematic diagram of the logic circuits which are employed in the converter of this invention. The 18.9 KHz clock is detected by detector 140 and its output is used to drive a Schmidt trigger circuit 142. The output of the Schmidt trigger which, is the squared envelope of the detector data clock, is shown in line D of FIG. 2. The output of the Schmidt trigger is applied to a gate 144. The second input to the gate 144 is the output of an "end of frame" NAND gate 146 (EOF) which detects when a four stage counter 148 has been cycled through all of its counts. The end of frame gate output, in the presence when the counter has filled, disenables gate 144 from applying clock pulses to the counter 148. At the end of the 16th count, the counter does not receive any more clock pulses until it is reset.

Figure 8:
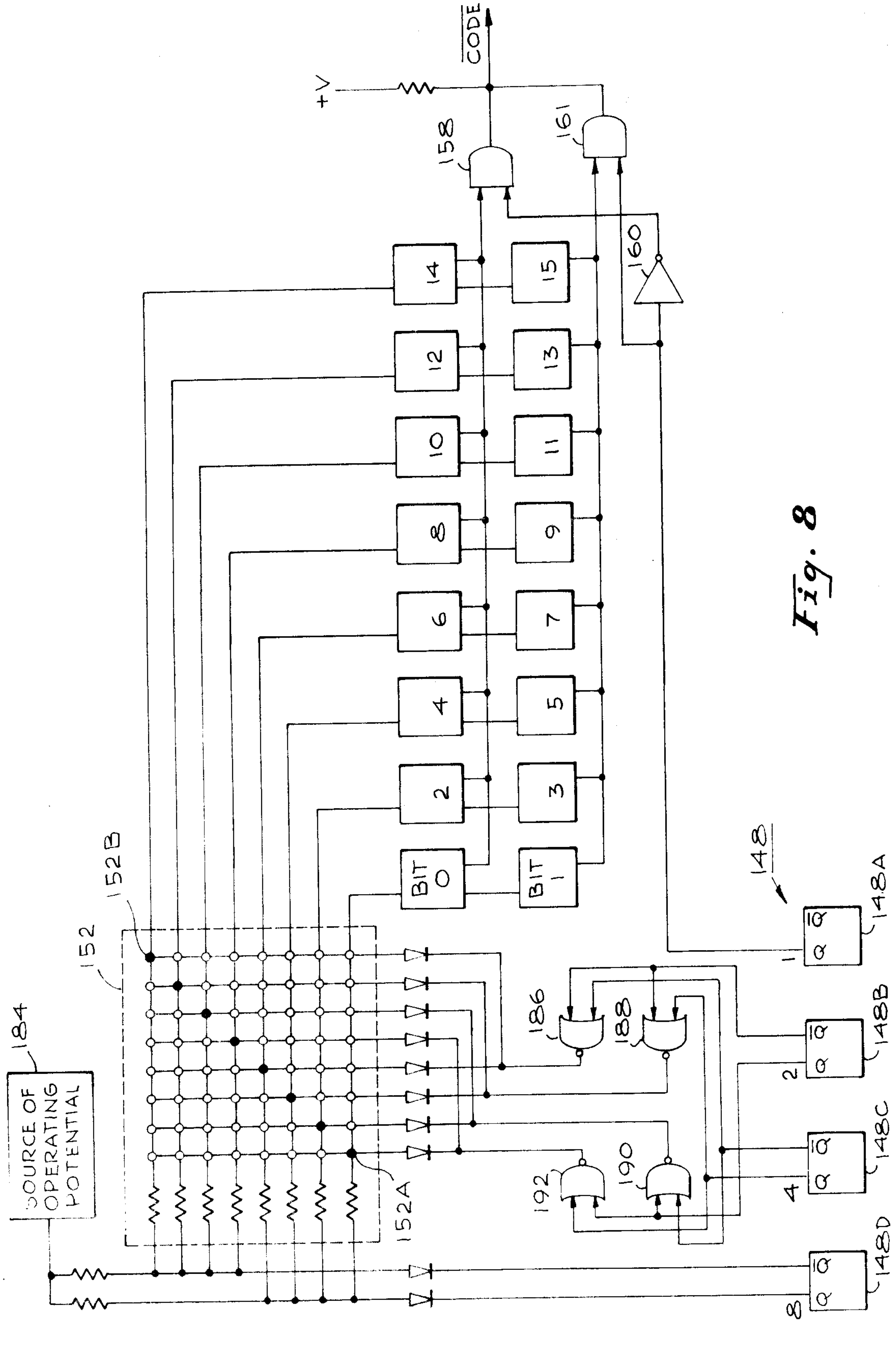
FIG. 8 is a block schematic diagram illustrative of the arrangement required at a converter for enabling it to respond to multiple codes.

The "one" outputs of the first three stages of the 16 bit binary counter 148 are applied to a decoding circuit 150. This constitutes an arrangment for energizing the input lines to an 8 × 8 code permutation matrix 152 in response to three inputs. The details of the decoding circuit and the code permutation matrix are shown in FIG. 8. However, the function of these circuits is to sequence the energization of eight lines to the card reader 154 whereby the bits of the code on the card are read out in the proper sequence and at the proper time to be compared with the code bits arriving from the transmitter.

The card reader 154 may comprise 16 phototransistors exemplified by the phototransistor 156. These phototransistors may be arranged in two rows of eight each, which are positioned to intercept light from the holes punched in a card which is inserted into the slot of the card reader. The code permutation matrix, which is sequenced, from the counter 148, successively permits operating potential to be applied to the collectors of the phototransistor two at a time. All the emitters of one row of the photodiodes are connected to the output on the card reader designated as Odd and all of the emitters in a second row of the photodiodes are connected to the output designated as Even. The last output from the photodiodes constitutes an Odd output.

The Even output is connected to an AND gate 158, which is enabled in response to an output from an inverter 160. The inverter is connected to the last count output of the counter 148 and enables gate 158, except when the last count occurs at which time the inverter output goes low and the gate is no longer enabled.

The Odd output line of the card reader 154 is connected to another AND gate 161. The second input to this AND gate is the last output of the counter 148, which is applied to the gate 161. The outputs of AND gates 158 and 161, comprise the serialized code on the card which a subscriber inserts into the opening in the converter which leads to the card reader. These are applied to a bit parity test circuit, which constitutes an exclusive OR gate 162. The exclusive OR gate compares the code read by the card reader with the code received over the CATV cable. If they are identical, no output is applied by the exclusive OR gate to reset an error flip-flop 164. If the two codes are not identical, then the error flip-flop 164 is reset.

The exclusive OR gate 162 is strobed, or enabled to make comparisons in response to the output of a data strobe circuit 166. This circuit generates a strobe pulse in response to the trailing edge of the clock pulse output of the Schmidt trigger 142. Essentially, it constitutes a well known differentiating circuit which selects and amplifies only the trailing edge of the clock pulse. This insures that the data from the card being read and the data received over the CATV cable are simultaneously present when the comparison test is to be made.

The 23.6 KHz logic data tone signals are detected by a detector 172 which drives the Schmidt trigger 174. Line E of FIG. 2 represents waveforms of the initial "data ready" pulse, followed by the presence or absence of data pulses as detected by the Schmidt trigger. The output of the Schmidt trigger is used to drive the exclusive OR gate 162 and is also applied to a sync generator 176. Another input to the sync generator is the output of Schmidt trigger 142. The sync generator constitutes a circuit which generates a single pulse output in response to the simultaneous presence of a data ready pulse and the positive going edge of a data clock pulse. In essence, the sync generator is an AND gate. It will be noted from FIG. 2 that the only time that the positive going edge of a clock pulse and any one of the clock pulses shown on Line C occurs, is only when a data ready pulse is present. The output of the sync generator 176 resets the counter 148 so that it can thereafter commence to count in response to data clock pulses. The sync generator output also sets the error flip-flop 164. Thereafter, the exclusive OR gate can commence to compare the code read from the card with the code received over the CATV cable.

At the end of a frame, if the error flip-flop has been reset, no output signal is applied to a Not AND gate 178. If the error flip-flop remains set, then it applies an output signal to the gate 178. Gate 178 is enabled, in response to the output from the end of frame gate 146. Its output when enabled is applied to a pulse integrator circuit 180, which functions to integrate the received pulses. The pulse integrator, which can constitute a simple capacitor-resistor circuit of well known type, followed by a discharging circuit and an amplifier, has its time constants set so that one pulse in every 10 frames is all that is required to maintain its output above a level such that a level detector 182 can maintain gated oscillator 106 in FIG. 5 operative. The reason for the 10 frame interval is to take care of problems which may arise either due to interruption in the power, or temporary drop out caused by a refrigerator or other electrical appliance starting up. This insures that there is no interruption in the television program as a result of these or other causes.

FIG. 8 illustrates details of the decoding circuit 150 and permutation matrix 152. The counter 148 is represented by four flip-flops 148A, 148B, 148C and 148D. The permutation matrix comprises an 8 × 8 array of two input AND gates, represented by circles, however only these circles such as 152A or 152B which are filled in are actually connected into the matrix. That is, these AND gates have a switch in one input. The matrix has an array of row and column busses. When the switch is an AND gate input is closed, that AND gate has one input connected to a row bus and the other to a column bus, other wise only one AND gate input is connected to the matrix and obviously the AND gate will not respond to signals applied to the row and column. Thus, for the representation in FIG. 8 only the AND gates along the one diagonal represented by darkened circles are connected to the row and column busses of the matrix.

A source of operating potential 184 is enabled to apply operating potential to either the upper four row busses or the lower four row busses depending upon the state of the fourth flip-flop stage, 148D of the counter 148, which consists of four flip-flops 148A, 148B, 148C and 148D. The second flip-flop 148B has its Q output connected to two Nor gates 190 and 192. The third flip-flop 148C has its Q output connected to Nor gates 186 and 190, and its Q output to Nor gates 188 and 192. The output of Nor gate 192 is connected to a first and fifth column of the matrix. The output of Nor gate 190 is connected to a second and sixth column of the matrix. The output of Nor gate 188 is connected to a third and seventh column, and the output of Nor gate 186 is connected to a fourth and eighth column of the matrix.

When flip-flops 148B and 148C have their Q outputs high, only Nor gate 192 has an output which enables any gates connected to the first and fourth column busses. If the Q output of flip-flop 148D is high at that time then only the top four row busses can carry a potential. Thus, because of the state of counter 184 and the connections of the code converter, only the NAND gate 152B is enabled. This enables the application of operating potential to the phototransistors used to read the first two code bits. Should the Q output of flip-flop 148D be high when 148B and 148C Q outputs are high then NAND gate 152A is enabled instead of 152B. From the foregoing, it should be apparent how the counter 148 sequences the matrix 152 to apply operating potential to the eight output lines. These are each connected to the collectors of two phototransistors represented as rectangles and labeled Bit O, Bit 1 . . . Bit 15.

The phototransistor outputs for even numbered bits 0 through 14 are connected to AND gate 158. The phototransistor outputs for odd numbered bits 1 through 15 are connected to AND gate 160 is enabled and one of the odd numbered bits is read. When the Q output is high AND gate 158 is enabled and one of the even bits is read.

Another secrecy feature of this invention is made possible with the permutation matrix. It will be recalled that this comprises an AND gate array, with each AND gate having a switch to enable it to be connected in or out of the matrix. The black dots in FIG. 8 represent the AND gates connected into the matrix. A means is thereby afforded to prevent a coded card sold to one individual to be used by another or to be duplicated by another. By rearranging the AND gates connected into the matrix, the sequence in which the holes in the punched card are scanned is changed, thus changing the code which is read out of the card. Thus, a coded card sold to one individual for use with one converter having one matrix arrangement cannot be used in a second converter of another individual having another matrix arrangement, even though the code being transmitted is the one that corroborates the card code when it is inserted in the first converter. To enable the second individual to see the program, he must obtain a card which is encoded so that the code which is being transmitted is rearranged for the scanning sequence of his converter. Thus, with this arrangement, cheating by punched card duplication is prevented.

Figure 9:
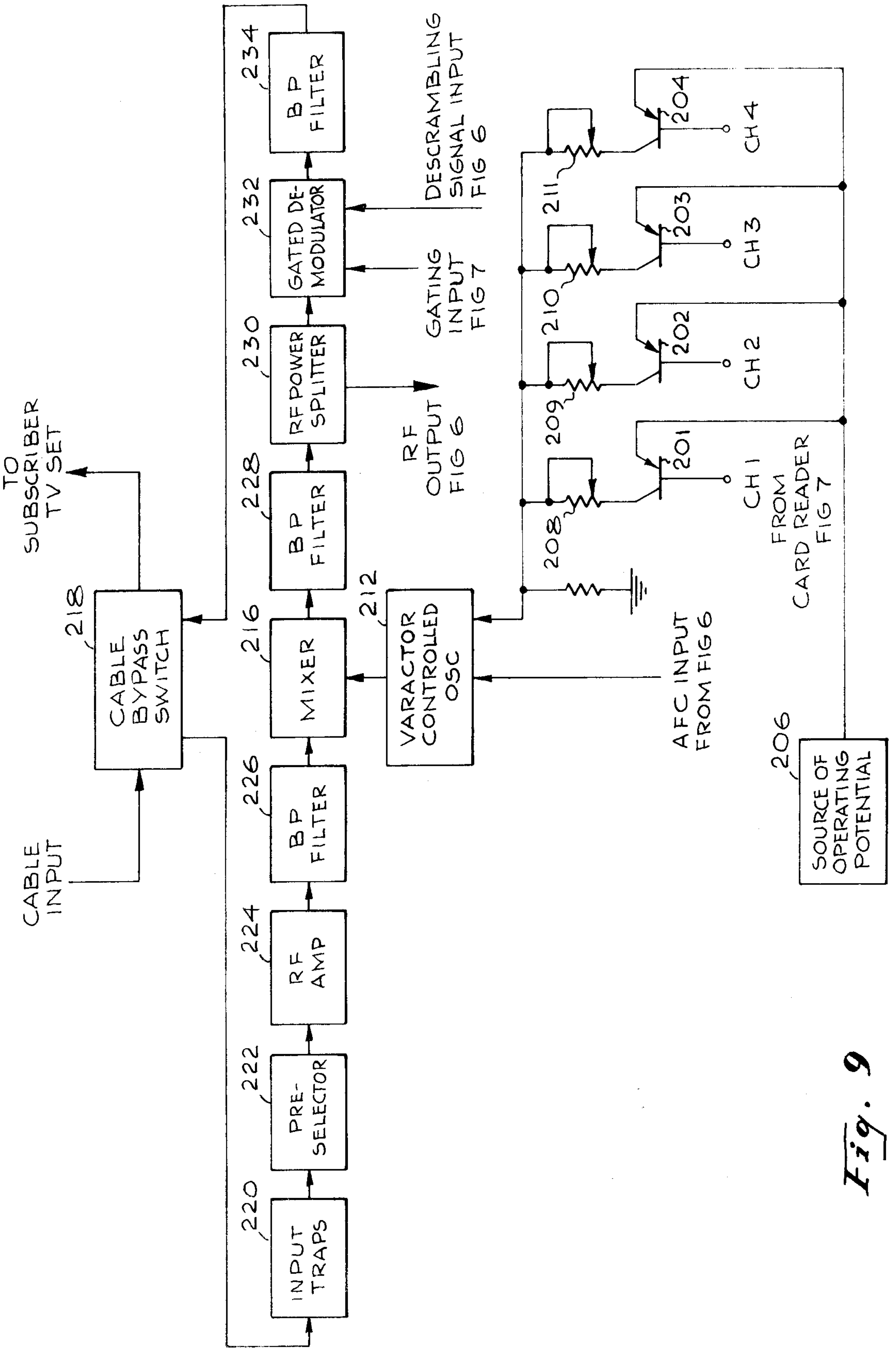
FIG. 9 is a block schematic diagram representative of a converter which is equipped with channel selection, in accordance with this invention.

FIG. 9 is a block schematic diagram illustrating an additional feature of this invention. It is possible to use the punched card to select one of the many channels being transmitted on the CATV cable, in addition to also having the code thereon to enable the converter to process the signals thereon so that they may be intelligibly handled by the television receiver. This is done by reserving a specific region of the punched card for the placement of a hole, the specific location of which is representative of the channel on which the particular program is being transmitted. For example, in FIG. 7, to the right of the card reader 154 are shown four lines respectively designated as channel 1, channel 2, channel 3, and channel 4. These are the channel select feature of the card reader. A hole will be placed in the punched card at one of the four locations which when read by the reader, enables a signal to be sent on a corresponding one of four lines. At each one of the four locations there will be a phototransistor.

In FIG. 9, each one of the four lines designated as channel 1 through channel 4, is connected to the base of a different transistor respectively 201, 202, 203, and 204. The emitters of these transistors are connected to a source of operating potential 206. The collectors are connected through the respective potentiometer 208, 209, 210, 211, to a varactor controlled oscillator 212.

Each one of the potentiometers 208 through 211 has its resistance adjusted such that the voltage applicable to the varactor controlled oscillator, when any one of the transistors is enabled, will cause the oscillator to oscillate at a different frequency.

The IF limiter and discriminator 132, FIG. 6, supplies an AFC output signal to the oscillator 212. The oscillator output is applied to a mixer 216. The other input to the mixer comes by way of the CATV cable to a cable bypass switch 218, which may be similar to the switch 88 shown in FIG. 5. The four channels, one of which is to be selected, may have four different super channel carriers, (i.e. above Channel 13). The switch connects the cable to input traps 220, which eliminate unwanted channels and the output of the input traps are applied to a preselector 222, which permits the four super channels, one of which is to be selected, to pass through. The output of the preselector is applied to an RF amplifier 224. The amplifier output is applied to a bandpass filter 226. The output of the bandpass filter is applied to the mixer 216. The output of the mixer will be signals on whatever channel has been determined by the hole location in the punched card.

The mixer output is applied to a bandpass filter 228. Its output is applied to an RF power splitter 230, whose function is to send a portion of the selected channel to the circuitry shown in FIG. 6 which performs the same function as it does for the circuitry of FIG. 5, namely provides the descrambling signal and extracts the clock and data signals.

The signal heretofore used to turn the oscillator 106 in FIG. 5, on or off, which is the output of the level detector 182 in FIG. 7, is now applied to a gated demodulator 232, and it functions to turn the demodulator on in the presence of the signal and to turn it off in the absence of the signal. The other input to the demodulator 232 is the descrambling input from the descrambling circuit in FIG. 6. The output of demodulator 232 is applied to a bandpass filter 234 and constitutes the selected channel which has been unscrambled and is in suitable form for intelligible processing by the subscriber's television receiver. It is applied through the cable switch to the television receiver.

Figures 10, 11:
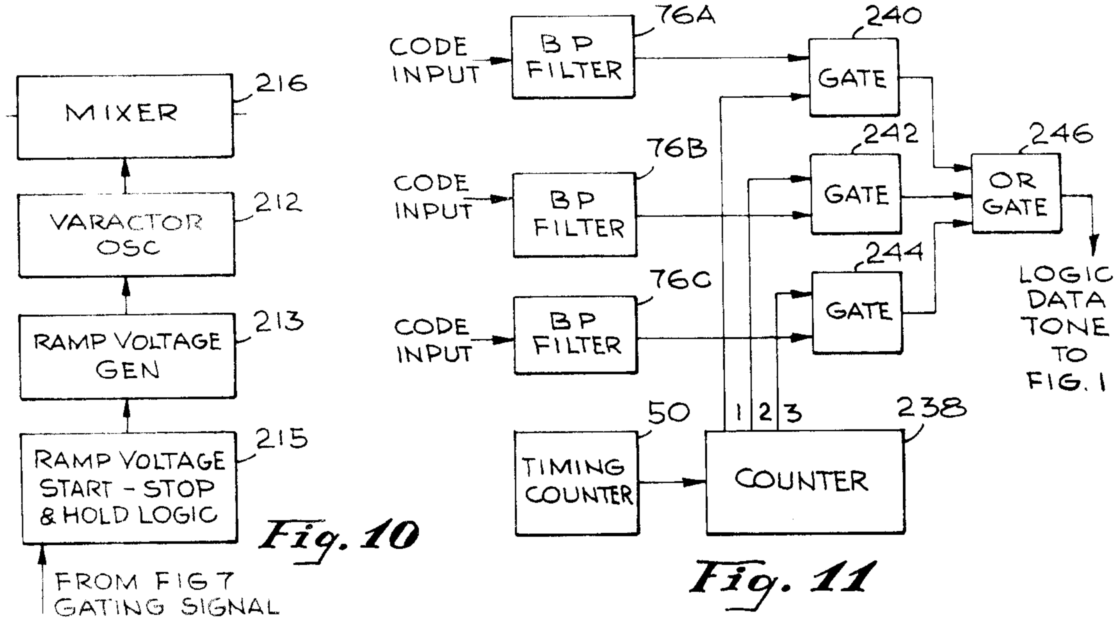
FIG. 10 is a modification of FIG. 9.
FIG. 11 is a block schematic diagram illustrative of the arrangement required at a transmitter for enabling multicode operation of the converter.

FIG. 10 shows a modification of FIG. 9. Instead of using extra holes on the coded card to select the channel carrying the desired program, this can be done with the code which is transmitted. FIG. 10 uses the same circuits as FIG. 9 except that the transistors 201 through 204 are omitted. In their place, the varactor controlled oscillator 212 is controlled by the output of a ramp voltage generator 213. This in turn is controlled by ramp voltage generator start stop and hold logic 215. This circuit is controlled by a gating signal, which is the output of FIG. 7.

The arrangement shown enables the varactor controlled oscillator to keep changing its frequency from channel to channel, cyling through all of them sequentially until a gating signal is received from the logic shown in FIG. 7, at which time it stays locked on the channel to which it is tuned when the gating signal occurs. Since each program which is transmitted also has code signals associated therewith, the gating signal will occur and be associatd with only the program out of all of these being transmitted. The circuits represented by the ramp voltage generator controlled by the ramp voltage start-stop and hold logic, are well known having been used for controlling station signal seeking circuits in automobile radios for example.

It was pointed out in connection with the description in FIG. 7 that to avoid problems due to power drop out, a pulse integrator 180 was employed whose function was to maintain the level of the signal received for at least 10 cycles or frames so that if a pulse was applied thereto, only once in every 10 frames, it was enough to keep the converter operating properly. Advantage of this may be taken to transmit many different codes and use correspondingly differently coded cards to receive the same program.

A situation may arise where, for example, a subscriber wishes to buy a season ticket to an entire series. In this event, he is issued a single punched card with a particular "season" code punched thereinto. Subscribers who wish to purchase a single one of a series may have different codes punched into their cards in accorance with the one of the series that they wish to see. With the system described thus far, different codes may be transmitted within a 10 frame period and the converter will still function properly.

FIG. 11 exemplifies the circuitry which may be employed at a transmitter to accomplish the foregoing. Assume that three different codes are desired to be transmitted. One code is to enable the converter to respond to punched cards which have bought out the season. A second code is to enable the converter to respond to punched cards which have bought out the first half of the season, and third code is to enable the converter to respond to punched cards which are only bought for the particular Program. For generating three codes, three code generators are employed. They may use the same data clock pulse source and they generate their codes in parallel. They may use a common timing counter 50. The timing counter 50 is used to advance a three count counter 238 each time it reaches its last count state.

Each count of the three state counter successivey enables three AND gates 240, 244, and 242, The inputs to these AND gates are the respective outputs of band pass filters 76A, 76B and 76C, corresponding to the band pass filter 76 in FIG. 3. The outputs of the three AND gates 240, 242 and 244 are serialized by an OR gate 246, whose output comprises the three codes following one after another in serial fashion.

As long as a punched card with any one of the three codes being transmitted is inserted into the card reader at the converter, the converter will function to process the television program signals received over the cable in a manner so that the television receiver of the subscriber can intelligibly process these signals.

While the converter has been described as having a card reader and has responded to punched cards, this should be understood to be by way of example. Magnetic crdas may also be used. Also, switches may be employed which can be set to statically represent a code which has been given to a subscriber, by say, a telephone call. The circuits shown herein in the converter can then sequence in the manner described to sequentially apply voltages to switches which are opened or closed in accordance with the code representation whereby a sequential code train is generated which can be compared with the received code.

There has accordingly been described and shown herein a novel and useful arrangement for a converter which is employed at a subscriber receiver in a CATV system. The converter has a reader therein which reads a coded card. If the code in the card corresponds to one or more of the codes being transmitted within a predetermined interval, the converter is enabled to function and process the television signals received over the CATV cable.

What is claimed is:

1. In a CATV system wherein at a transmitter a train of digital code signals along with a train of associated clock signals is seuqentially and repetitively generated and transmitted along with television program signals modulated on a carrier, and which requires further processing for intelligible utilization by a television receiver, and a converter is connected to each subscriber receiver and includes means to receive said television program signals modulated on a carrier, said digital code signals and said associated clock signals, the improvement in said converter comprising:

means in said converter for establishing a static condition representative of said digital code signals, means responsive to said static condition and said clock signals for sequentially generating said digital code signals at said converter, means for comparing said digital code signals generated at said receiver with the code signals received from said transmitter and producing an identity signal when they are alike, each time said digital code is received by said converter, integrator means for retaining each identity signal for a predetermined interval, long enough for said receiver to receive a plurality of trains of code signals, means enabled responsive to the presence of said identity signal of said integrator means for processing said television signals modulated on a carrier to enable intelligible utilization by said subscriber receiver.

2. In a CATV system as recited in claim 1 wherein said transmitter generates a plurality of different code signal trains, and said predetermined interval of said code integrator means extends long enough for said converter to receive said plurality of different codes at least once.

3. In a CATV system as recited in claim 1 wherein said means responsive to said static condition and to said clock signals for sequentially generating said digital code signals at said converter includes matrix means responsive to said clock signals for ordering the sequence of the generation of said digital code signals whereby different converters may require the establishment of different static conditions to obtain an identity signal responsive to the same code being transmitted.

4. In a CATV system as recited in claim 3 wherein said means for establishing a static condition representative of said digital code signals comprises a coded card reader.

5. In a CATV system as recited in claim 3 wherein said means for establishing a static condition representative of said digital code signals comprises a set of adjustable switches.

6. In a CATV system wherein, at a transmitter a digital code is generated and transmitted along with television program signals requiring further processing for intelligible utilization by a television receiver, and a converter is connected to each subscriber receiver and includes means to receive said television program signals and said digital code, the improvement in said converter comprising, means for receiving a digital code bearing document in said converter, means for reading the digital code borne by a document inserted into said means for receiving, means for comparing the digital code received by said converter and the digital code read by said means for reading and producing an identity signal when they are alike, and means enabled responsive to the presence of said identity signal to further process said television program signals.

7. In a CATV system as recited in claim 6 wherein said code bearing document is a punched card; said means for reading the digital code borne by a document is a punched card reader; and includes means for reading the code in said punched card serially and in synchronism with the code received by said converter.

8. In a CATV system as recited in claim 6 wherein said television program signals are modulated on a carrier having a nonstandard frequency which is not receivable by a subscriber receiver, and the further processing required for said television program signals is to convert the carrier from a non-standard frequency not receivable by a subscriber television receiver to a standard frequency receivable by a subscriber television receiver; said means in said converter which is enabled responsive to the presence of said identity signal comprises oscillator means for producing an output for heterodyning with said televisionprogram carrier for shifting it to a standard frequency receivable by a television receiver.

9. In a CATV system as recited in claim 6 wherein said means for reading the digital code borne by a document inserted into said means for reading includes means to produce a tuning signal, means responsive to said tuning signal for tuning said converter to process particular television program signals.

10. In a CATV system wherein at a transmitter a train of digital code signals is sequentially and repetitively generated and transmitted along with television program signals modulated on a carrier, and which requires further processing for intelligible utilization by a television receiver, and a converter is connected to each subscriber receiver and includes means to receive said television program signals modulated on a carrier and said code signals, the improvement in said converter comprising:

means for receiving a digital code bearing document in said converter, means for sequentially reading the digital code borne by a document inserted into said means for receiving, means for comparing the digital code read by said means for sequentially reading and the digital code received by said converter and producing an identity signal when they are alike each time said digital code is received by said converter, integrator means for retaining each identity signal for a predetermined interval long enough for said converter to receive a plurality of trains of code signals, and means enabled responsive to the presence of said identity signal of said integrator means for processing said television signals modulated on a carrier to enable intelligible utilization by said subscriber receiver.

11. In a CATV system as recited in claim 10 wherein said code bearing document is a punched card; said means for reading the digital code borne by a document is a punched card reader; and includes means for reading the code in said punched card serially and in synchronism with the code received by said converter.

12. In a CATV system as recited in claim 10 wherein said transmitter includes means for generating and transmitting a plurality of different code trains of code signals along with said television program signals modulated on a carrier, sequentially within the predetermined interval of said integrator means.

13. In a CATV system as recited in claim 10 wherein said converter includes a tunable oscillator means, said means for reading includes means responsive to at least a portion of the digital code borne by said document for producing a tuning signal, and means for tuning said tunable oscillator means responsive to said tuning signal to a particular frequency for enabling said converter to process predetermined television program signals modulated on a carrier.

14. In a CATV system as recited in claim 13 wherein said means enabled responsive to the presence of said identity signal, comprises a demodulator which receives the output of said oscillator.

15. In a CATV system as recited in claim 10 wherein said transmitter transmits a plurality of different television program signals modulated on different carriers, each of which requires further processing for intelligible utilization by a television receiver and each having associated trains of code signals, and there is included a variable oscillator means, means for causing said variable oscillator means to sequence through successive frequencies which are required for successively processing all of said television program signals modulated on different carriers, and means responsive to an identity signal to terminate further operation of said means for causing, whereby a predetermined one of said television program signals modulated on a carrier is processed.

16. In a CATV system as recited in claim 10 wherein said means for sequentially reading the code borne by a document inserted into said means for receiving includes matrix means for ordering the sequence of the read out of the digits of the code in accordance with a predetermined sequence whereby different converters require different code bearing documents to obtain an identity signal responsive to the same code.

17. In a CATV system wherein at a transmitter there is sequentially and repetitively generated a data ready pulse followed by a clocked digital code along with clock pulses and also television program signals modulated on a carrier which require further processing for intelligible utilization by a subscriber receiver, and a converter is provided at each subscriber receiver and includes means to receive all of said signal generated at said transmitter, the improvement in said converter comprising:

digital code bearing document reading means for reading the digital code on a code bearing document applied thereto, means responsive to said data ready pulse and said clock pulses for synchronizing the read out of the digital code by said reading means with the clocked digital code received by said converter, means for comparing the digital code read by said means for reading with the digital code received by said converter and producing an identity signal when they are alike each time said digital code is received by said converter, integrator means for retaining each identity signal for a predetermined duration, long enough for said converter to receive a plurality of data ready pulses followed by a clocked digital code, means connected to said integrator means and enabled responsive to the presence of said identity signal for processing said television programs signals for intelligible utilization by a subscriber receiver.

18. In a CATV system as recited in claim 17 wherein said means responsive to said data ready pulse and said clock pulses for synchronizing the readout of the digital code by said reading means with the clocked digital code received by said converter includes, matrix means for ordering the sequence of read out of the code digits in accordance with a predetermined sequence whereby different converters require different code bearing documents to obtain an identity signal responsive to the same transmitted code.

19. In combination, in a CATV system, a transmitter having means for sequentially generating within a predetermined interval a plurality of different binary codes, which are repetitively generated, and means for generating television program signals modulated on a carrier which require further processing for intelligible utilization by a subscriber receiver, converter means connected to receive said different binary codes and said television program signals modulated on a carrier, said converter means having means for receiving a digital code bearing document in said converter, means for sequentially reading the digital code borne by a document insertd into said means for receiving, means for comparing the digital code read by said means for sequentially reading and the digital code received by said converter and producing an identity signal when they are alike each time said digital code is received by said converter, integrator means for retaining each identity signal for an interval long enough for said converter to receive said plurality of different binary codes at least once, and means enabled responsive to the presence of said identity signal of said integrator means for processing said television signals modulated on a carrier to enable its intelligible utilization by said subscriber receiver.

20. In a CATV system as recited in claim 19 wherein said means responsive to said data ready pulse and said clock pulses for synchronizing the readout of the digital code by said reading means with the clocked digital code received by said converter includes, matrix means for ordering the sequence of readout of the code digits in accordance with a predetermined sequence whereby different converters require different code bearing documents to obtain an identity signal responsive to the same transmitted code.

21. In combination, in a CATV system, a transmitter having means for generating a plurality of different television program signals respectively modulated on different carriers, each of which requires further processing for intelligible utilization by a subscriber receiver;

converter means connected to receive said plurality of different television program signals respectively modulated on different carriers, said converter means including digital code bearing document means for reading the code on a document applied thereto, including means for generating a different tuning signal for each different digital code read by said digital code bearing document means, oscillator means to which tuning signals from said means for generating a different tuning signal is applied for tuning said oscillator means to a frequency determined by each different tuning signal, mixer means to which said oscillator means output and said plurality of different television program signals respectively modulated on different carriers are applied, for processing for utilization by said subscriber receiver the one of said plurality of different television program signals as determined by the digital code read by said digital code bearing means.

22. In combination in a CATV system, a transmitter having means for generating a plurality of different television program signals respectively modulated on different carriers, each of which requires further processing for intelligible utilization by a subscriber receiver, converter means connected to receive said plurality of different television program signals respectively modulated on different carriers, said converter means including digital code bearing document means for reading the code on a document applied thereto, including means for generating a different tuning signal for each different digital code read by said digital code bearing document means, and means responsive to the code read by said digital code bearing document means for processing for utilization by said suscriber receiver a predetermined one of said plurality of different television program signals.

23. In combination in a CATV system, a transmitter having means for generating a plurality of different television program signals respectively modulated on different carriers, each of which requires further processing for intelligible utilization by a subscriber receiver, means for generating sequentially and within a predetermined interval a different binary code for each different television program which is repetitively generated, converter means connected to receive said different binary codes and said television program signal modulated on a carrier, said converter means having means for receiving a digital code bearing document in said converter, means for sequentially reading the digital code borne by a document inserted into said means by receiving, means for comparing the digital code read by said means for sequentially reading and the digital code received by said converter and producing an identity signal when they are alike each time said digital code is received by said converter, integrator means for retaining each identity signal for an interval long enough for said converter to receive said plurality of different binary codes at least once, a variable oscillator means, means for causing said variable oscillator means to sequence through successive frequencies which are required for successively processing all of said television program signals modulated on different carriers, means responsive to an identity signal of said integrator means to terminate further operation of said means for causing whereby a predetermined one of said television program signals modulated on a carrier can be partially processed, further means enabled responsive to said identity signal to complete the processing of said television signals modulated on a carrier to enable its utilization by a television receiver.

* * * * *